Feb. 15, 1927.
H. S. FARQUHAR
1,617,516
VALVE MECHANISM
Filed March 31, 1921   7 Sheets-Sheet 1
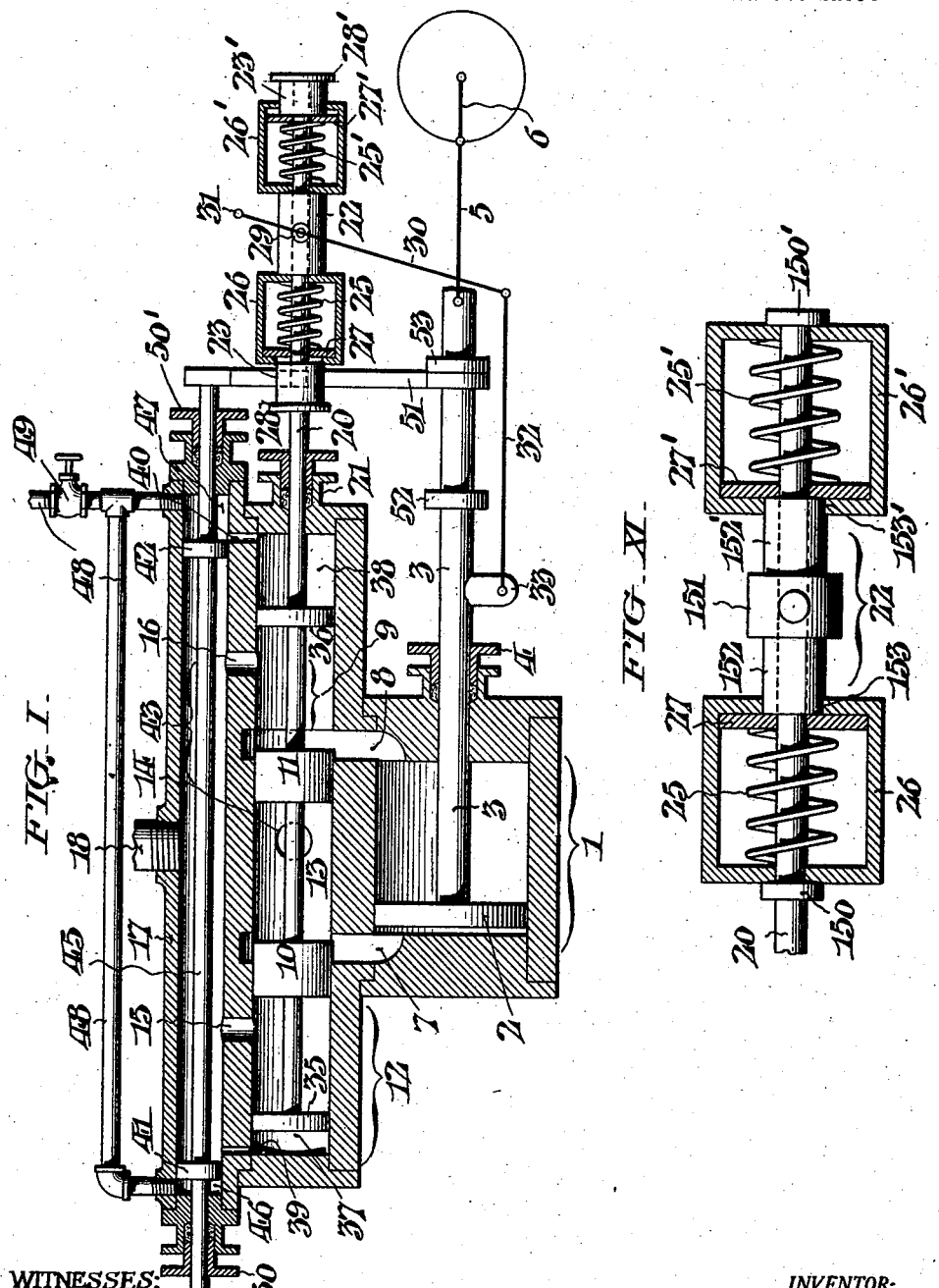
WITNESSES:
INVENTOR:
Henry S. Farquhar,
BY
ATTORNEYS.

Feb. 15, 1927.

H. S. FARQUHAR

VALVE MECHANISM

Filed March 31, 1921

WITNESSES:

INVENTOR:
Henry S. Farquhar,
BY
ATTORNEYS.

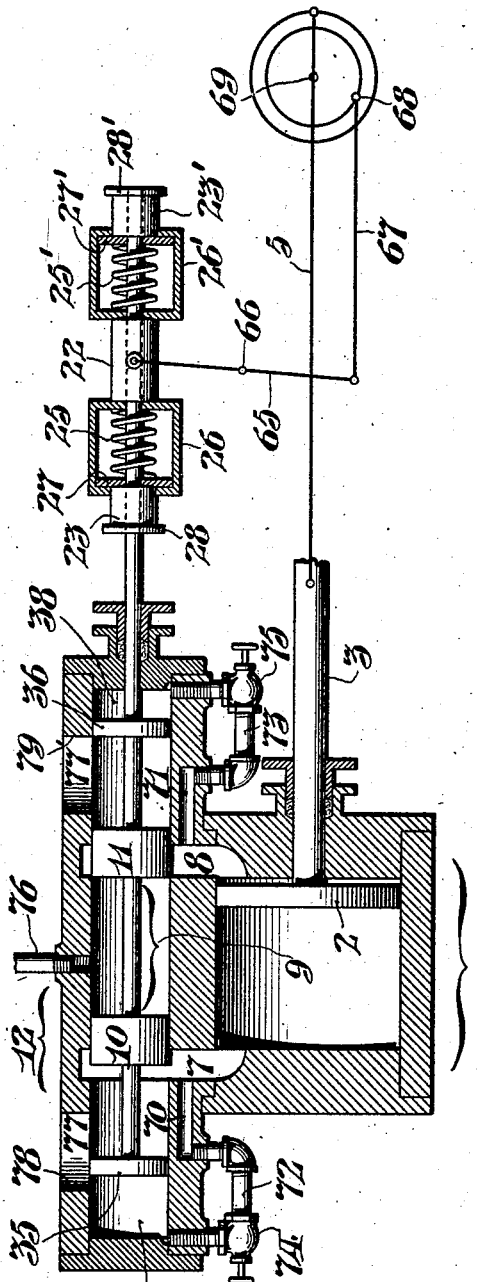

Feb. 15, 1927.
H. S. FARQUHAR
VALVE MECHANISM
Filed March 31, 1921
1,617,516
7 Sheets-Sheet 4
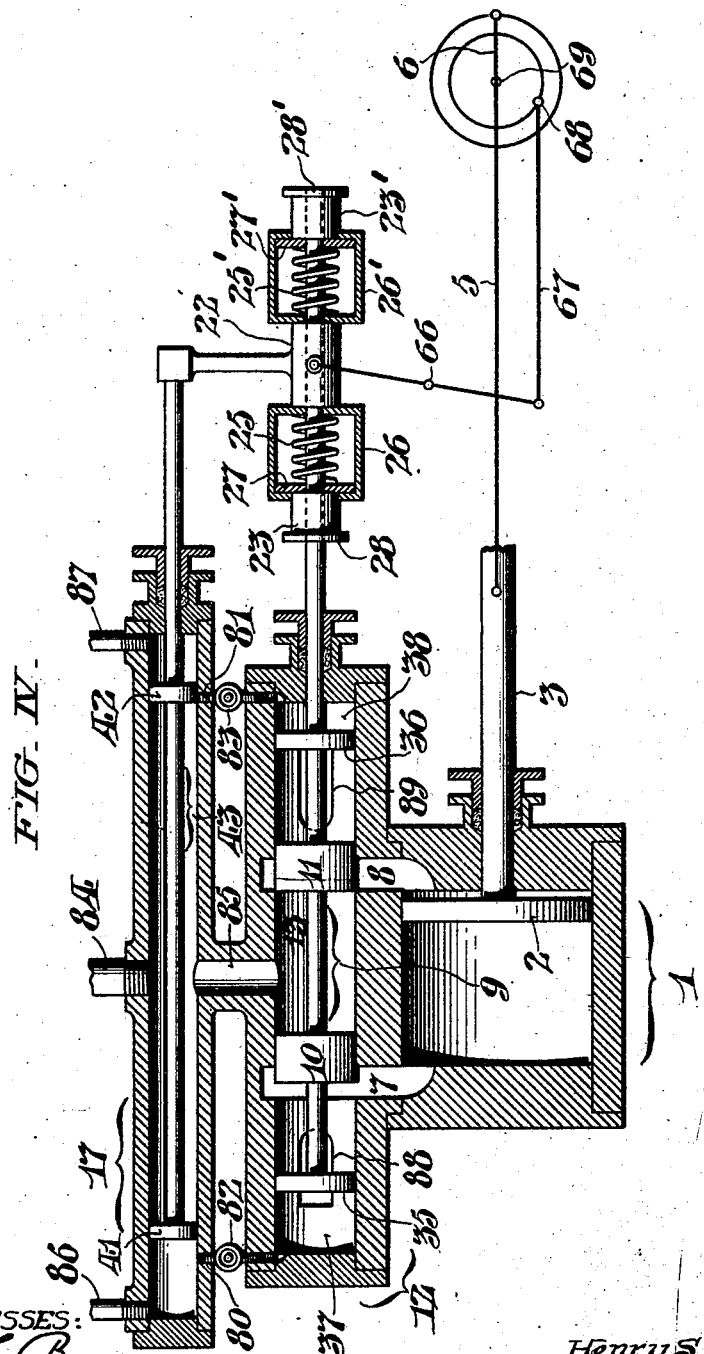
FIG. IV.
WITNESSES:
INVENTOR:
Henry S. Farquhar,
BY
ATTORNEYS.

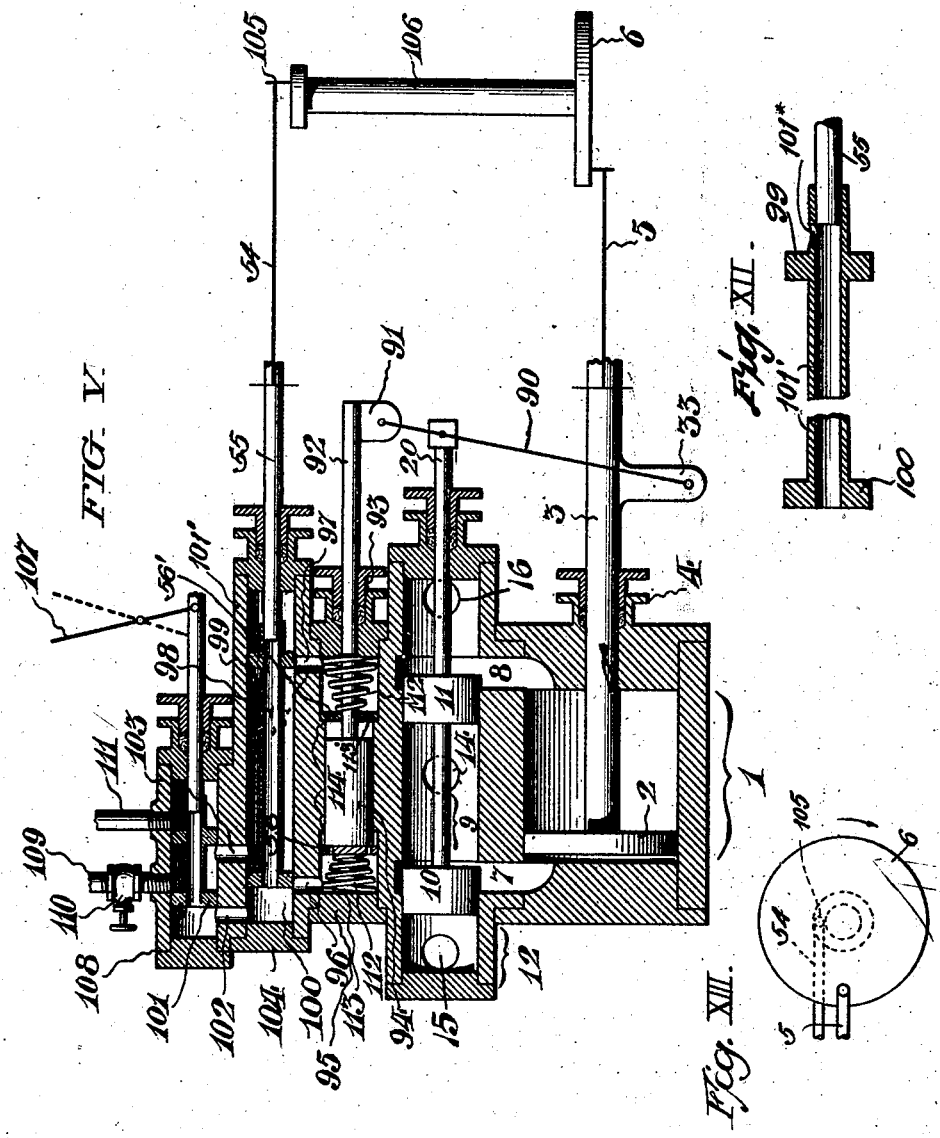

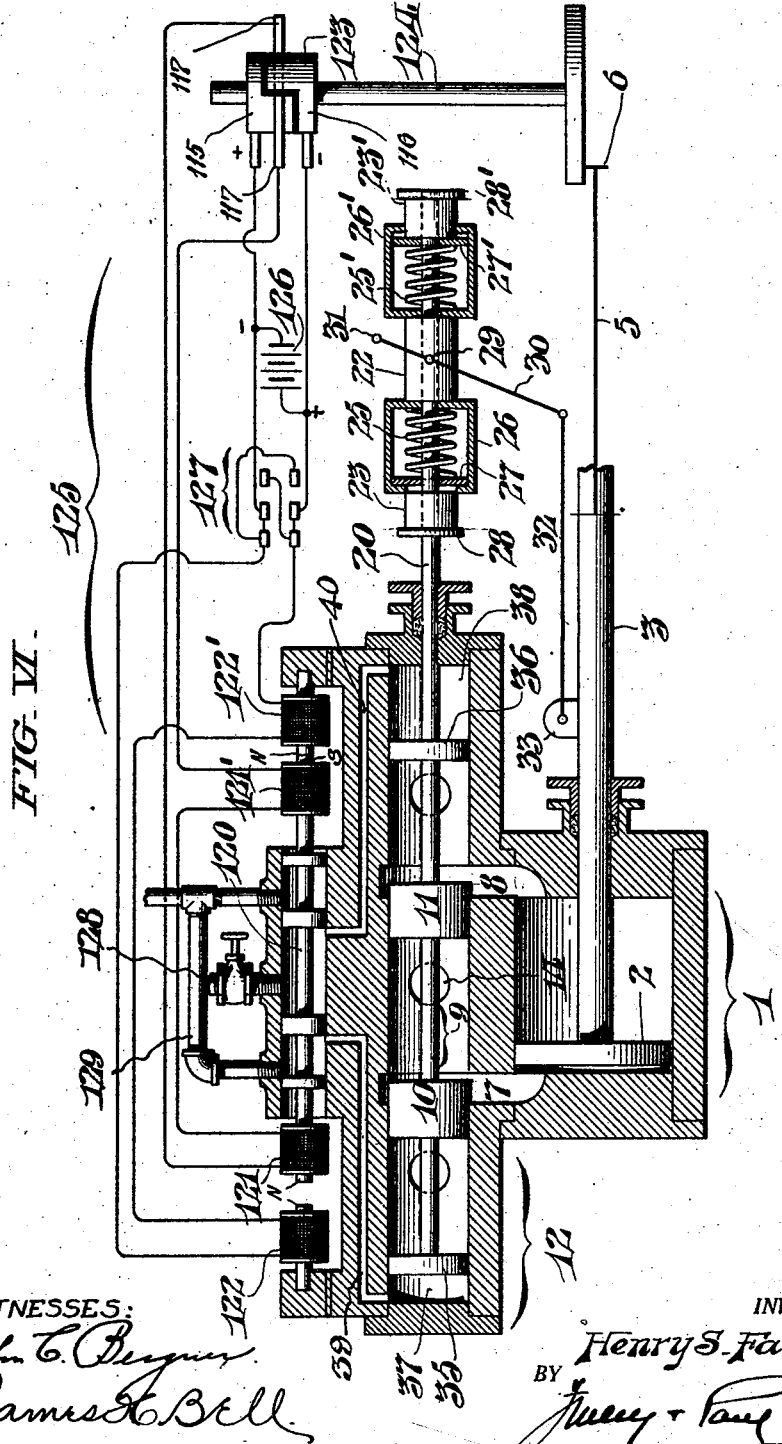

Feb. 15, 1927.
H. S. FARQUHAR
VALVE MECHANISM
Filed March 31, 1921
1,617,516
7 Sheets-Sheet 7
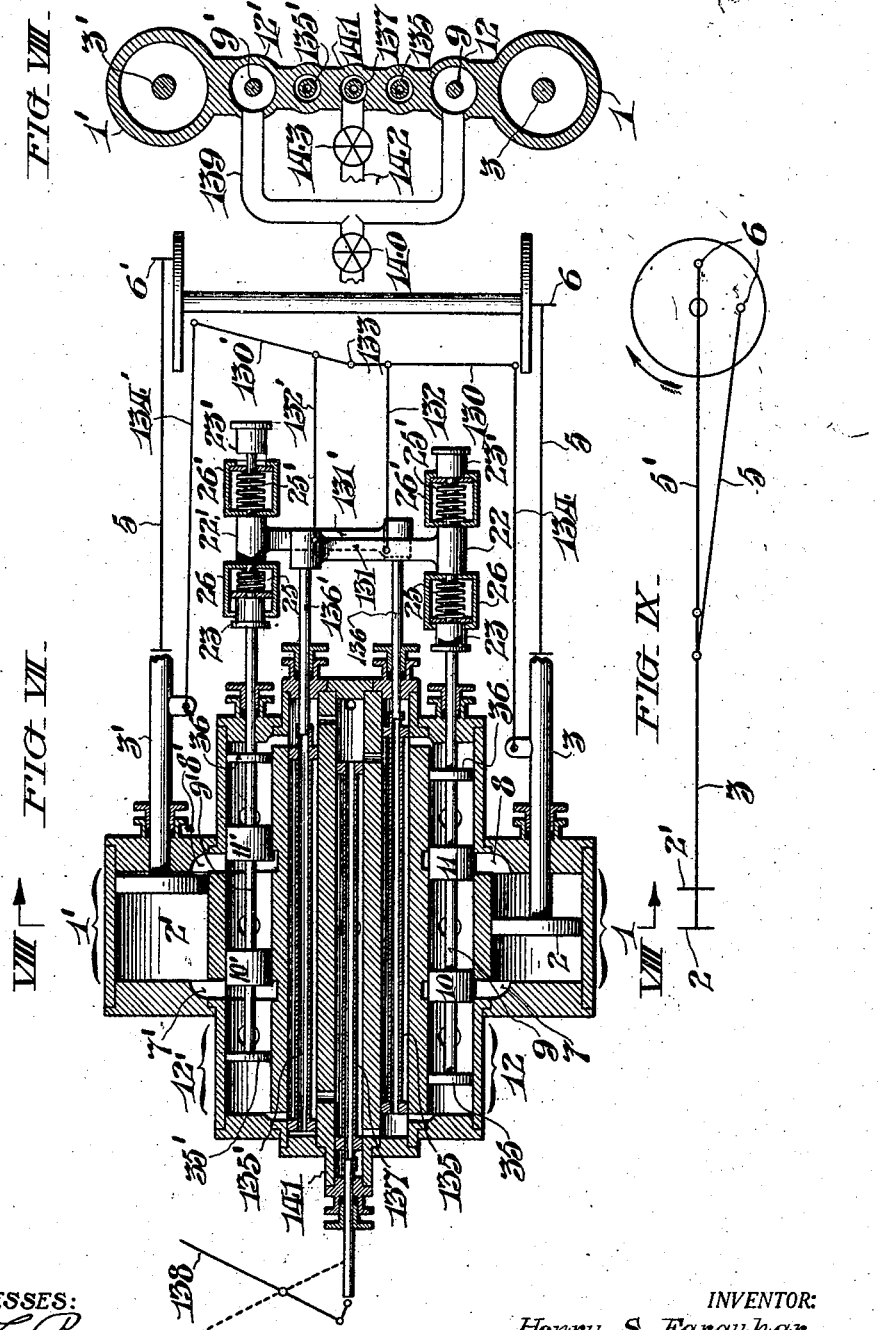
WITNESSES:
INVENTOR:
Henry S. Farquhar,
BY
ATTORNEYS.

Patented Feb. 15, 1927.

1,617,516

UNITED STATES PATENT OFFICE.

HENRY S. FARQUHAR, OF WAYNE, PENNSYLVANIA.

VALVE MECHANISM.

Application filed March 31, 1921. Serial No. 457,427.

My invention relates to valve mechanism for fluid pressure engines of the reciprocating or oscillating piston type.

The object of my invention is to make it possible to vary the position of the slide valve, so that cut-off of the fluid pressure may be caused to take place at any desired point within the limits of the opening of the port or ports which the valve controls, and without necessitating any change whatever in the structure of the valve. This desideratum I attain by relegating to the valve, capacity for limited motion independent of a definite normal throw which may be derived in any convenient manner, for example, by coordination with the engine crank shaft or piston, and providing means whereby such independent motion of the valve may be governed or regulated to vary its cut-off position in accordance with the engine speed or power desired.

My invention lends itself readily to embodiment in various forms, and these, together with advantages procurable through the same, will be readily understood from the detailed description which follows.

In the drawings, Fig. I is an axial section of a fluid pressure engine conveniently embodying my invention.

Figs. II, III, IV, V and VI are similar views showing modified forms of my invention.

Fig. VII is a horizontal axial section showing my invention as embodied in a two cylinder engine.

Fig. VIII is a cross section of the structure shown in Fig. VII as viewed in the direction of the arrows VIII—VIII thereon.

Fig. IX is a diagram showing the relation of the crank centres of the same.

Figs. X and XI are detail views on an enlarged scale showing the yielding or compensating means by which the valve is allowed a limited extent of free motion to permit under regulative control, variation of the cut-off position of the valve, one or the other of the forms of these devices being employed in several embodiments represented in the drawings; and Fig. XII is a detail view in section of an auxiliary valve illustrating the same on an enlarged scale.

Fig. XIII is a crank motion, diagrammatically shown, later on more particularly described.

Referring to Fig. I of the drawings, 1 designates the engine cylinder which may be of any approved type or construction, and within which reciprocates a piston 2 attached to a piston rod 3. This piston rod 3 passes through a stuffing box 4 at one end of the cylinder 1, and is coupled by a connecting rod 5, with the crank 6 of the engine, the last two elements being shown diagrammatically in the illustration. Steam is admitted and exhausted through ports 7 and 8 located, respectively, at opposite ends of the cylinder 1, under control of a piston valve 9 which comprises heads 10 and 11. The piston valve 9 is guided for reciprocation in a chest 12 which is attached in an appropriate manner to the cylinder 1 at one side. The central chamber 13, set apart in the chest 12 by the piston heads 10 and 11, communicates with a source of live steam supply through a pipe 14, while the exhaust steam escapes from the spaces beyond the piston heads 10 and 11 through ports 15 and 16 which communicate with a supplemental valve chamber 17 which, in turn, is exhausted through a pipe 18.

Coming back to the valve 9, it will be seen that its actuating rod 20 extends through a stuffing box 21 at one end of the chest 12 to the exterior, and has there mounted upon it, a shiftable sleeve 22, which is normally held in a central position between two fixed collars 23—23' on said valve stem under the action of compression springs 25—25' which are housed within appropriate casings or cages 26—26', see also Fig. X. At one end, each spring 25 and 25' abuts directly against the cage wall, while at the other, it engages with one of a pair of disks 27 and 27' which normally rest against their corresponding collars 23 and 23'. By this construction, the valve rod 20 may (as will be directly explained in detail) be shifted independently of the sleeve 22 in either direction within the limits imposed by the flanges 28—28' of the respective collars 23—23', said flanges being adapted to function as stops in cooperation with the outer ends of the casings 26 and 26'.

The sleeve 22 has a pivotal connection at 29 with a rocker arm conventionally represented in Fig. 1, and indicated by the numeral 30, and shown as fulcrumed about a fixed pivot 31. The lower end of the rocker arm 30 is coupled, through the instrumentality of a link 32, with a lug 33 of the engine piston rod 3. Through the connections just described, it will be apparent that the valve rod 20 is given definite normal throw, which, in practice, is made equal to, or slightly more than the lap of the valve 9, depending upon the amount of lead which is to be accorded the valve piston heads 10 and 11.

Referring once more to the valve 9, it will be seen to comprise, in addition to the main piston heads 10 and 11, auxiliary pistons 35 and 36 which are so disposed relatively, as to set apart at the ends of the valve chest 12, spaces 37 and 38, steam being admitted and exhausted from said spaces, through ports 39 and 40, communicating with the ends of the supplemental valve chest 17 previously referred to. The ports 39 and 40 are controlled by the heads 41 and 42 of a supplemental piston valve 43, which heads are fixed to the valve rod 45. The spaces 46 and 47 at the ends of the supplemental valve chest 17 set apart by the piston heads 41 and 42, communicate with a source of steam supply through a pipe connection 48 which has interposed in it, a conventional pressure or power reducing valve 49 whereby the delivered pressure may be accurately regulated or controlled. This pressure or power reducing valve 49 is of any standard type adapted to choke flow therethrough, but which receives the motive fluid (steam for example) at a certain pressure and delivers it to the supplemental valve chest 17 at a predetermined lower potential pressure or power. Or, an ordinary hand-operated valve, such as indicated, varying the flow by the extent to which it is opened may be employed; it being obvious that the particular type of valve adopted is determined by its adaptability for the purpose specified. In order that the supplemental piston valve 43 may at all times be in perfect steam balance, the rod 45 is passed to the exterior at each end through stuffing boxes 50—50', and the forward protruding end of said rod has secured to it, a depending bar 51 which extends into the path of fixed collars 52 and 53 attached to the engine piston rod 3 in spaced relation so as to allow a certain extent of lost motion over that required to effect actuation of the piston valve 43.

The operation of the above described organization is as follows:

Let it be assumed that the engine crank 6 is on dead centre in the position shown in Fig. I, and the piston 2 at the extreme end of its stroke to the left. By reason of its coordination with the piston rod 3, as already understood, the sleeve 22 and hence the valve 9 has just been given its maximum normal throw in the same direction, and for like reason, the supplemental valve 43 has been shifted correspondingly to the position illustrated. At this time, the valve head 10 is just about to permit admission of steam to the port 7 at the left hand end of the cylinder 1 (or has just "cracked" open in accordance with the lead allowed as hereinbefore suggested), while the port 8 has been uncovered to begin permitting exhaust of the steam from the cylinder at the right of the piston 2. Under these conditions, but a small quantity of steam will be admitted through the port 7 to actuate the piston 2 were it not for the excess movement imparted to the valve 9 through steam admitted from the pipe 48 to the space behind the piston 36 of the main valve under control of the piston 42 of the supplemental valve 43. This causes to a definite extent the overcoming of the resistance of the spring 25', the amplitude of the over throw of the valve heads 10 and 11 depending, of course, upon the pressure of the steam admitting to the piston 36 of the valve 9, and determining the position of cut-off of the steam to the cylinder 1. Obviously, by increasing or decreasing the pressure of the steam delivered by the valve 49 such increased or decreased pressure will result in overcoming more or less the power of the springs 25 or 25', and will accordingly vary the position of cut-off, and in this way control the speed and power at which the engine will run. From the above, it will be seen that the speed of the engine will, within limits, remain constant for a definite setting of the valve 49, regardless of changes in the load. This characteristic may be briefly described as follows:

As the load upon the engine is increased, thus tending to retard its speed, pressure within the pipe 48 will, as a consequence, be permitted to accumulate momentarily, therefore bringing about a larger extent of overthrow of the valve 9 in varying the position of cut-off until normal speed has been resumed, whereupon the parts will act in the normal capacity as first suggested.

Considering the parts still to be in the position shown in Fig. I, it will be noted that the spent steam which has just effected the left hand movement of the piston 2 is permitted to escape through the port 8 into the valve chest 12 in the interval between the piston heads 11 and 36, and from thence through the port 16 into the supplemental valve chest 17, from which the steam finally escapes through the pipe 18. The operation of the engine for the reverse stroke is effected in precisely the same manner as just described.

Referring now to Fig. II, the structure therein represented is, in the main, identical with the form first described, and corresponding parts have been accordingly identified with similar reference numerals. Instead of mounting the sleeve 22 directly on the valve rod 20, the same is here shown as slidably supported by a stationary rod 60 projecting from a point of anchorage in the engine casing and which also supports the springs 25—25′, and the associated elements. In place of the rocker arm 30 of the previous embodiment, I have substituted an arm 61 which differs from the former in that it has its fulcrum 63 on the sleeve 22, but is similarly coupled, by means of a connecting rod 62 with the lug 33 of the piston rod 3, so as to derive motion therefrom. The actuating rod 20 of the piston valve 9 is pivoted at 64 to the rock arm 61, and, therefore, given, as before, a definite normal throw by reason of the coordination of the rock arm 61 with the engine piston 2. The independent motion characteristic of my invention is accorded the valve 9 by reason of the yielding action of the springs 25—25′ in permitting changes in the positions of the sleeve 22, and accordingly the fulcrum 63 of arm 61, so that the ultimate result obtained in this embodiment is precisely the same as that obtained in the first described form.

In the organization represented in Fig. III, the principle of operation of the means whereby the valve 9 is given its independent motion, is the reverse of that of the previous forms described herein. In other words, variation of the cut-off positions of the valve 9, in this instance, is obtained by robbing the same more or less, of its normal throw. Referring to the illustration, the rock arm 65 is shown as being fulcrumed intermediate its ends about a fixed pivot 66, and actuated, through an interposed link 67, directly by a separate crank or eccentric 68 from the engine shaft 69. This rock arm 65 thus imparts to the valve 9, a normal throw in a manner already well understood. The steam by which the auxiliary pistons 35 and 36 of the valve 9 are actuated is obtained directly from the cylinder ports 7 and 8 with which communicate respectively, lateral ducts 70 and 71 by which the steam is delivered to pipe connections 72 and 73 under control of separate pressure reducing valves 74 and 75 of like character to the valve 49 hereinbefore described in connection with Fig. I. It is to be particularly noted, however, that the steam admitted behind the auxiliary piston 36 of the valve 9 opposes the movement of the latter derived from the rock arm 65, under yielding permitted by the spring 25′ at the right of the sleeve 22 at a time when the parts of the engine occupy the illustrated positions.

While the operation of this form of my invention is, in all other respects, similar to that of the previous embodiments, it differs slightly in details of construction in the following particulars:

The steam which propels the engine is supplied directly to the valve chest 12 through a pipe 76, and after being spent, is exhausted from the same through ports 77—77′, which are extended at their ends 78 and 79 so as to permit the escape of the steam from the valve chest ends 37 and 38, should the pressure against the pistons 35 and 36 become so great as to tend to prematurely exhaust the steam from cylinder 1.

In the showing of Fig. IV, the operation of the engine there represented is precisely the same as that of the embodiment of Fig. III, except that in this case, actuation of the auxiliary heads 35—36 of the main valve 9 is subject to the control of the auxiliary valve 43 as in the very first form with certain modifications which may be briefly described as follows:

The pipe connections 80 and 81 through which steam is admitted to actuate the auxiliary pistons 35 and 36 of the valve 9, are separately controllable through pressure reducing or controlling valves 82 and 83 respectively of like character to the valve 49 hereinbefore explained. Steam for the whole organization is supplied through a single pipe 84 entering the supplemental valve chest 17, and in turn conducted from thence through a by-pass 85 to the subdivision 13 of the main valve chest 12 intermediate the piston heads 10 and 11. Exhaust from the ends of the supplemental valve chest 17 escapes by way of pipes 86 and 87, while that from the cylinder 1 and the ends of the main valve chest 12 discharges through ports 88 and 89 which are extended for a reason already given in connection with the description of Fig. III. The supplemental valve 43 may be shifted by means such as shown in Fig. I.

In Fig. V, the piston valve 9 is actuated by a rocker arm 90 fulcrumed at 91 to the end of a rod 92 which protrudes through a stuffing box 93, and has attached to its inner end a piston 94 which is slidable in a chest 95. Steam is admitted to, and exhausted from the chest 95, through ports 96 and 97 under control of a supplemental slide valve 98. The heads 99 and 100 of the valve 98 are joined by a tubular rod 101′ Fig. XII which affords a through passage 101* by way of which steam may be either admitted or exhausted, depending upon the position of a reversing slide valve 101 (for reversing direction of rotation of the engine), which controls ports 102 and 103 leading to the supplemental valve chest 104. The supplemental slide valve 98 is actuated by a crank or eccentric 105 on the engine shaft 106 through the medium of a pitman 54 and valve rod 55 (Fig. XIII), while the reversing valve 101 is controllable manually by means of a hand lever conventionally represented at 107 in the illustration. Steam is supplied to the chest 108 of the reversing slide valve 101 through a pipe 109 which has interposed in it, a pressure reducing or controlling valve 110 like the valve 49 hereinbefore explained. Exhaust from the reversing slide valve chest 108 is carried off through a pipe 111. In this form of my invention, independent movement of the main slide valve 9 is obtained through the motion of the piston 94 induced by steam alternately effective upon opposite ends of said piston in opposition to compensating springs 112—112'. These springs 112—112' bear at one end, against disks 113—113' which normally engage shoulders 114 in maintaining the piston 94 in its central position, and disks 113—113' are perforated with small holes 56—56', as shown, to permit access of the steam to the ends of said piston. Steam is admitted at 14 and exhaust takes place through 15 and 16. The operation of the organization just described is thought to be obvious without necessitating special description.

In Fig. VI, I have shown the supplemental valve 120 which controls admission and exhaust of steam in the course of the actuation of the auxiliary pistons 35 and 36 of the main slide valve 9, as being reciprocated electrically. To this end, I have mounted to the ends of the supplemental valve rod electro magnets 121—121' which serve as armatures in cooperation with similar, aligned stationary magnets 122—122' appropriately supported by the engine frame. These several magnets 121—121' and 122—122' are energized under control of a rotary or commutator switch 123 mounted upon the engine shaft 124. This switch 123 comprises two segments 115—116 which are relatively insulated and adapted for cooperation with suitable brushes 117 at the terminals of the conductors comprised in the wiring system comprehensively indicated by the numeral 125. The commutator switch 123 serves to effect reversal of the polarity of the magnets 121—121' every half revolution of the engine shaft 124 in bringing about the proper shifting of the main slide valve 9 in admitting and exhausting steam from the cylinder 1. The wiring system 125 receives its energy from a battery 126, and a double throw switch 127 interposed in said system affords a means for reversing the direction of rotation of the engine through reversal of the polarity of the magnets 122—122'. Steam is admitted to the chest of the supplemental valve 120 through a valve controlled supply pipe 128, and exhausted through a pipe connection 129.

Referring now to the embodiment of my invention of Figs. VII, VIII and IX, the organization there represented is in the form of a two cylinder engine having its cranks 6—6' ninety degrees apart. The main slide valves 9—9' for the cylinders 1—1' receive their normal throw from rocker arms 130—130' coordinated with integral opposedly curved extensions 131—131' of the sleeves 22—22' through connectors 132—132'. These rocker arms 130—130' are fulcrumed to a common, fixed pivot 133 and coupled with the engine piston rods 3—3' by links 134—134'. The supplemental valves 135—135', controlling admission and exhaust of steam to and from the pistons 35 and 36 and 35' and 36' of the main valves 9—9', are actuated by virtue of a direct connection of their rods 136—136' with the extensions 131—131' respectively of the sleeves 22—22 as in the engine shown in Fig. IV. The supplemental valves 135—135' are constructed hollow after a manner already explained in connection with the form shown in Fig. V. The engine is made reversible through the instrumentality of a centrally disposed slide valve 137 subject to the manual control of the hand lever 138. Steam is supplied to the valve chests 12—12' by a pipe connection 139 (Fig. VIII) under control of a hand valve 140, and to the chest 141 of the reversing slide valve through a pipe 142 similarly provided with a control valve 143.

Lastly, referring to the detailed modification of the compensating devices in Fig. XI, the casings or cages 26—26' are held immovable under compression of the springs 25—25' against fixed stops 150—150' on the valve rod 20. The sleeve 22, in this instance, has a head 151 by which its independent shifting with respect to the rod 120 is limited, said head encountering alternately the ends of the casings 26—26', and the reduced extremities 152—152' of said sleeve move through openings 153—153' in the casing ends to engage with the abutment discs 27—27'. The modified form of compensating device just described may obviously be employed in connection with any of the previously described embodiments of my invention with the exception of the form represented in Fig. V.

Having thus described my invention, I claim:

1. In a reciprocating engine, the combination of a cylinder, a piston valve for controlling admission of motive fluid to the cylinder, said valve having a definite normal throw insufficient to provide a full intake aperture to the cylinder, means permitting motion independent of said normal throw, and means for automatically regulating the extent of such independent motion to correspondingly vary the normal cut-off position of said valve within the limits of the intake aperture which it controls.

2. In a reciprocating engine, the combination of a cylinder, a piston valve for controlling admission of motive fluid to the cylinder, means whereby said valve is given a definite normal throw insufficient to provide a full intake aperture to the cylinder, means permitting motion of the valve independent of said normal throw, and means for automatically regulating the extent of such independent motion to correspondingly vary the normal cut-off position of said valve within the limits of the intake aperture which it controls.

3. In a reciprocating engine, the combination of a cylinder, a piston valve for controlling admission of motive fluid to the cylinder, said valve having a definite normal throw insufficient to provide a full intake aperture to the cylinder, means permitting independent motion of the valve over and above said normal throw, and means for regulating the extent of such independent motion to correspondingly vary the normal cut-off position of said valve within the limits of the intake aperture which it controls or in proportion to the engine speed.

4. In a reciprocating engine, the combination of a cylinder, a sliding piston valve having piston heads for controlling the inlet and exhaust of motive fluid through ports at opposite ends of the cylinder, means for imparting to the valve a definite normal throw insufficient to provide a full intake aperture to the cylinder, attached supplemental fluid actuated pistons whereby the valve is shifted to a limited extent independent of its normal throw in either direction, and means for controlling the actuating fluid to vary the extent of such independent motion to correspondingly vary the normal cut-off positions of the piston valve within the limits of the intake aperture which it controls or in proportion to the engine speed.

5. A reciprocating engine comprising a cylinder, a sliding piston valve for controlling admission and exhaust of motive fluid at opposite ends of the cylinder, means for imparting to the valve a definite normal throw insufficient to provide a full intake aperture to the cylinder, said means including a shiftable sleeve and collars mounted on the stem of the valve, springs intermediate said sleeve and collars acting in opposition to centralize the sleeve, means for reciprocating said sleeve, in combination with separate means for imparting to the valve motion independent of its normal throw in opposition to the aforesaid springs, and regulating means for controlling the extent of such independent motion to vary the cut-off position of the aforesaid valve.

6. A reciprocating engine including a cylinder, a sliding piston valve having piston heads for controlling admission and exhaust of motive fluid at opposite ends of the cylinder, means for imparting to the valve a definite normal throw insufficient to provide a full intake aperture to the cylinder, said means including a shiftable sleeve and fixed collars mounted on the stem of the valve, springs intermediate said sleeve and collars acting in opposition to centralize the sleeve, devices for reciprocating said sleeve, auxiliary fluid actuated piston heads attached to the valve for imparting to the same motion independent of its normal throw in either direction in opposition to the aforesaid springs, in combination with regulating means for controlling the supply of the motive fluid to vary the extent of independent motion and correspondingly vary the cut-off position of the aforesaid valve.

7. A reciprocating engine including a cylinder, a main sliding piston valve having piston heads for controlling admission and exhaust of motive fluid at opposite ends of the cylinder, means for imparting to the valve a definite normal throw insufficient to effect a full intake aperture to the cylinder, said means including a shiftable sleeve and fixed collars mounted on the stem of the valve, springs intermediate said sleeve and collars acting in opposition to centralize the sleeve, link motion for reciprocating said sleeve, auxiliary fluid actuated piston heads attached to the valve for imparting to the same motion in excess of its normal throw in either direction in opposition to the aforesaid springs, in combination with a supplemental piston valve for controlling access of the motive fluid to the auxiliary piston heads of the main valve, and a valve for governing the supply of the actuating fluid to vary the extent of excess motion by regulating the cut-off position of said main piston valve.

8. A reciprocating engine including a cylinder, a main sliding piston valve for controlling the admission and exhaust of motive fluid at opposite ends of the cylinder, means for imparting to the valve a definite normal throw insufficient to effect a full intake aperture to the cylinder, said means including a shiftable sleeve and fixed collars mounted on the stem of the valve, a spring intermediate each end of the sleeve and its juxtaposed collar acting in opposition to centralize said sleeve, a rocker arm for reciprocating the aforesaid sleeve, said rocker arm receiving its motion through coordination with the movements of the engine crank, in combination with means for imparting motion to the valve independent from that derived from the rocker arm, and a regulating valve for controlling the extent of such independent motion to vary the cut-off position of the valve within the limits of the intake aperture which it controls.

9. In a reciprocating engine, the combination of a piston valve functional to control admission of motive fluid to the engine cylinder; mechanical means coordinated with the valve piston rod for normally shifting the valve; means for actuating the piston valve by motive fluid pressure; and means regulating the actuation of the piston valve to automatically vary its point of cut-off within the limits of the intake aperture which it controls.

10. A reciprocating engine comprising a cylinder having ports used alternately for intake and exhaust; a piston valve controlling said ports; means to normally operate the valve so that the ports are fully lapped in one position and unlapped in the other position to a limited extent to provide a minimum intake aperture; means to effect movement of the valve independent of the normal actuating means; and spring-balanced mechanism permitting automatic auxiliary movement of the valve to provide an increased intake opening for the ports which it controls or in direct proportion to the speed of the engine.

In testimony whereof, I have hereunto signed my name, at Philadelphia, Pennsylvania, this 26th day of March, 1921.

HENRY S. FARQUHAR.